(12) United States Patent
Griessnig

(10) Patent No.: US 7,915,841 B2
(45) Date of Patent: Mar. 29, 2011

(54) METHOD FOR USING A CONTROL DEVICE IN A SAFETY-RELATED ENVIRONMENT

(75) Inventor: Gerhard Griessnig, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 439 days.

(21) Appl. No.: 12/220,477

(22) Filed: Jul. 24, 2008

(65) Prior Publication Data

US 2009/0033269 A1 Feb. 5, 2009

(51) Int. Cl.
*G05D 1/00* (2006.01)
(52) U.S. Cl. .. 318/16; 318/587; 318/568.1; 318/568.12; 318/568.16; 318/588.25; 340/10.1; 340/990; 701/208; 701/300; 701/301; 701/302; 700/253; 235/472.02
(58) Field of Classification Search .................. 340/990, 340/10.1; 235/472.02; 701/208, 300, 301, 701/302; 700/253; 318/587, 568.1, 568.12, 318/568.16, 568.25, 581, 16
See application file for complete search history.

(56) References Cited

U.S. PATENT DOCUMENTS

| | | | | |
|---|---|---|---|---|
| 5,631,642 A | * | 5/1997 | Brockelsby et al. | 340/993 |
| 6,717,382 B2 | * | 4/2004 | Graiger et al. | 318/587 |
| 7,148,803 B2 | * | 12/2006 | Bandy et al. | 340/539.16 |
| 7,280,045 B2 | * | 10/2007 | Saarisalo et al. | 340/572.7 |
| 7,339,477 B2 | * | 3/2008 | Puzio et al. | 340/572.1 |
| 7,439,864 B2 | * | 10/2008 | Hunt et al. | 340/572.7 |
| 7,492,254 B2 | * | 2/2009 | Bandy et al. | 340/540 |
| 2001/0035729 A1 | * | 11/2001 | Graiger et al. | 318/587 |
| 2004/0118920 A1 | * | 6/2004 | He | 235/454 |
| 2007/0297890 A1 | | 12/2007 | Sjoberg et al. | |
| 2009/0051495 A1 | * | 2/2009 | Hunt et al. | 340/10.1 |
| 2010/0127824 A1 | * | 5/2010 | Moschl et al. | 340/5.65 |

FOREIGN PATENT DOCUMENTS

| | | |
|---|---|---|
| EP | 1479964 A2 | 11/2004 |
| EP | 1672385 A1 | 6/2006 |
| WO | WO 2006000571 A1 | 1/2006 |
| WO | WO 2006105567 A2 | 10/2006 |
| WO | WO 2007025879 A1 | 3/2007 |

* cited by examiner

*Primary Examiner* — Rita Leykin

(57) ABSTRACT

There is described a method for using a mobile control device, with which a machine can be operated within an assigned effective range. To this end an effective range list is configured, which is checked on the basis of transponder data from RFID transponders.

6 Claims, 3 Drawing Sheets

FIG 2

| | TAG ID (2 Byte) | WB (1 Byte) | Distance (1 Byte) |
|---|---|---|---|
| 000 | x | x | x |
| 001 | x | x | x |
| 002 | x | x | x |
| | x | x | x |
| | ⋮ | ⋮ | ⋮ |
| | x | x | x |
| 125 | x | x | x |
| 127 | x | x | x |

| CRC (2 Byte) |
|---|
| x |

FIG 3

| WB (1Byte) | Name (String) |
|---|---|
| 1 | Press |
| 2 | Machine |
| 3 | |
| 4 | |
| ⋮ | ⋮ |
| 252 | |
| 253 | |
| 254 | |

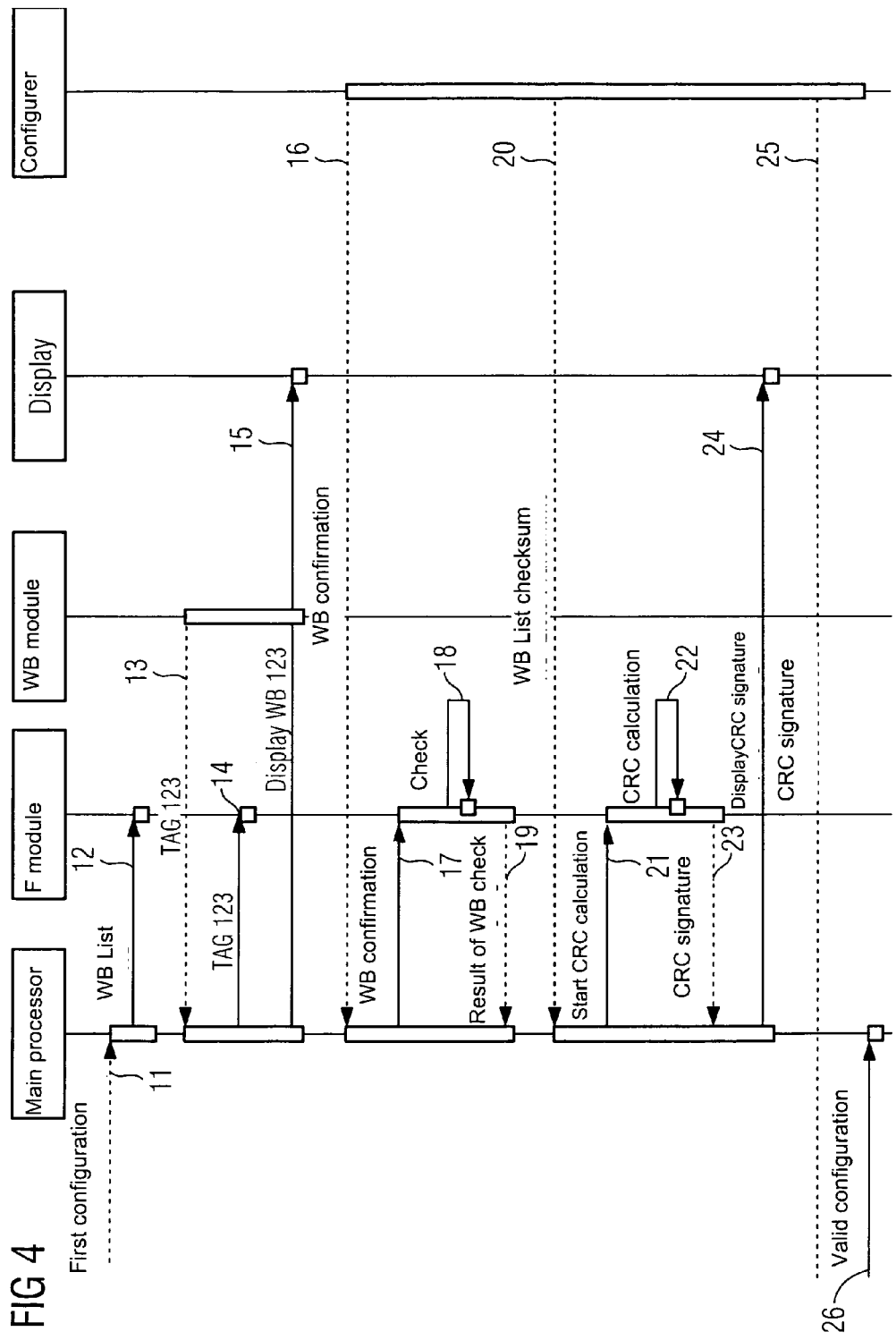

METHOD FOR USING A CONTROL DEVICE IN A SAFETY-RELATED ENVIRONMENT

CROSS REFERENCE TO RELATED APPLICATIONS

This application claims priority of European Patent Office application No. 07015227.7 EP filed Aug. 2, 2007, which is incorporated by reference herein in its entirety.

FIELD OF INVENTION

The invention concerns a method for using a mobile device in a safety-related environment.

BACKGROUND OF INVENTION

It is not permitted to perform dangerous actions on machines or systems in the safety-related environment from just any location. Until now it has only been possible to operate these systems at stationary points or using wired devices. However, these limiting factors are obviated by wireless technology. To fulfill safety engineering requirements, areas must be technically defined and an unambiguous assignment made to these areas. It is already known for suitable effective ranges to be defined, within which a machine is operated wirelessly using a control device, the effective ranges being delimited by one or more RFID transponders. Safety requirements are imposed on the use of such control devices in connection with the function of the effective ranges.

SUMMARY OF INVENTION

An object of the invention is hence to propose a method of the type mentioned above which satisfies the requisite safety aspect by introducing safety measures when configuring, commissioning and handling the effective ranges.

The object is achieved with the features as claimed in an independent claim. In detail this method may include the following method steps: method for using a mobile control device, with which at least one machine in a system can be operated, the control being effected within an effective range assigned to the machine which is delimited by one or more RFID transponders, having the following steps:
a) an effective range list is configured, containing the effective range assigned to each of the RFID transponders installed in the system, as well as the maximum distance between the control device and the relevant RFID transponders and
b) the effective range list is checked, for which purpose the relevant transponder identification number is received from the RFID transponders using the control device in test mode in the effective ranges of the RFID transponders and subsequently the relevant effective range identification number is displayed.

Advantageous developments of the method can be taken from the subclaims.

BRIEF DESCRIPTION OF THE DRAWINGS

An embodiment of the invention is explained in more detail below on the basis of a drawing. The drawing shows.

DETAILED DESCRIPTION OF INVENTION

Figure 1:
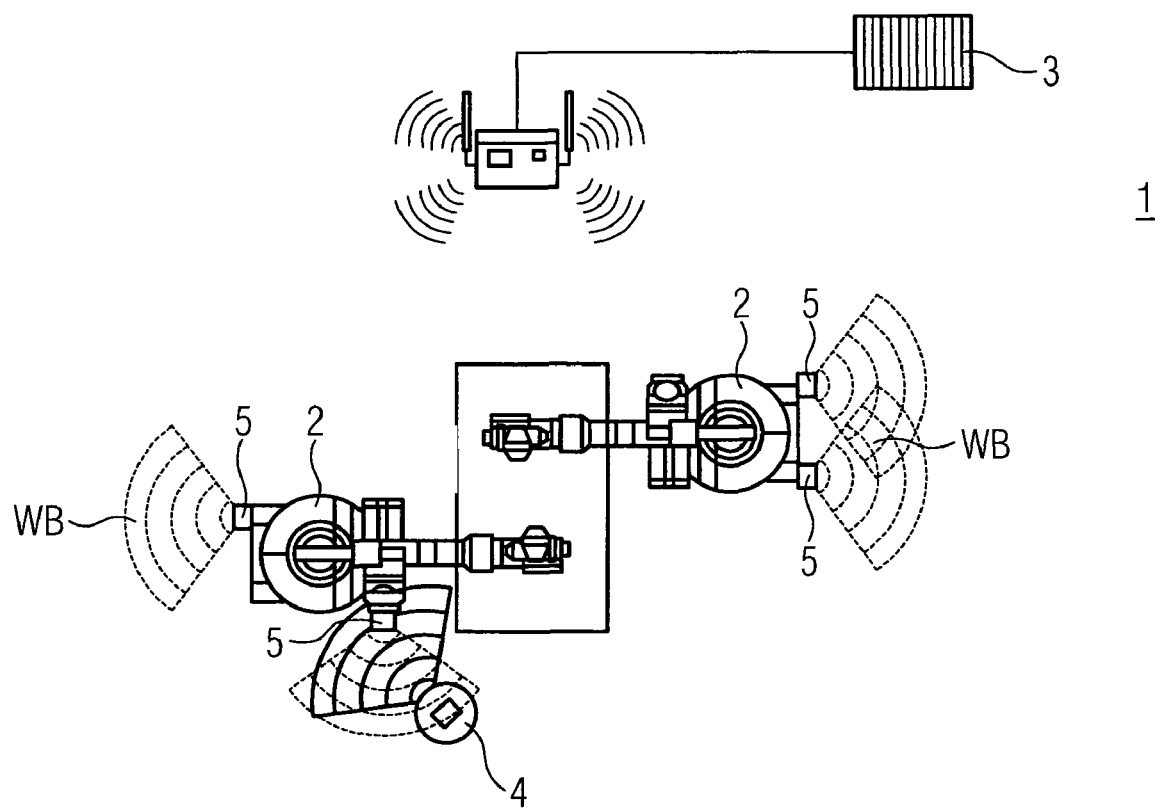
FIG. 1 a system with a mobile, wirelessly communicating control device for operating machines in a safety-related environment, FIG. 2 an effective range list for the control device of a system according to FIG. 1, FIG. 3 a list of effective ranges and names assigned to them and FIG. 4 a flow chart showing method steps for implementing safety measures.

FIG. 1 illustrates a system 1 for controlling machines 2 or systems. The system 1 has a controller 3 and a mobile control device 4 which has means for wireless communication, here in particular a radio link, with the controller 3.

Operation of the machines 2 is permitted only after logging on in effective ranges WB set using special RFID transponders (TAG) 5. "Dangerous" actions, e.g. movement of machines, cannot be performed until after logging on in these effective ranges WB.

To fulfill safety engineering requirements, areas must be technically defined, and a unique assignment to these areas must take place. Accordingly, effective ranges WB set by one or more RFID transponders 5 are defined for the system 1. In this case the spatial definition of the effective ranges WB is determined by the antenna characteristics of the RFID transponders 5 and by the configurable maximum distance between the mobile control device and the relevant RFID transponders 5.

The mobile control device 4 has non-safety-related hardware and software components (effective range module, WLAN, HMI, etc.) supported by a safety module (F module) with safety measures in order to implement safety-related effective ranges WB according to the invention. To this end the aforementioned set effective ranges are initially configured using an engineering system ES. For each effective range WB an associated transponder identification number TAG ID and a maximum permitted distance from the mobile control device 4 is allocated in accordance with the table in FIG. 3.

An erroneous entry in the configuration (WB, TAG ID) using the engineering system ES or an erroneous installation of RFID transponders 5 can result in impermissible control of the effective ranges WB. To prevent this, safety mechanisms are defined which use technical and organizational measures to check the configured effective ranges WB and to enable the configuration and the implemented effective ranges WB to be approved.

The first safety measure is to perform a plausibility check on the parameters entered, by checking that the effective ranges WB and the transponders are unique. Another check is made to see whether the configured distance within an effective range WB is identical. It is also ensured that the configuration matches the installation in the system. This check on the configuration and installation is performed by the user with the control device 4 and is supported technically by a safety-related parameter CRC.

To hinder or prevent logging on in an "incorrect" effective range WB a further safety measure entails assigning a separate name to every effective range WB characterized by an effective range identification number WB-ID, as illustrated in FIG. 3. The idea behind this is that the "unsafe" application HMI works with the names for the effective ranges WB and only the names for the effective ranges WB are displayed to the user. In contrast, the safety module (F module) of the mobile control device 4 works with the effective range identification numbers WB-ID. In the event of a logon in an effective range WB the user must also be located in the corresponding effective range WB, something which is checked in the safety module (F module), for which purpose the user enters the associated effective range identification number WB-ID permanently installed in the system using the HMI of the mobile control device 4. This entry is checked in the safety module (F module) using the currently determined data. In known fashion HMI is the human-machine user interface.

The check on the effective range list WB List configured using the engineering system ES is performed on the basis of method steps 11 to 26, which are illustrated in FIG. 4 and are explained below.

| | |
|---|---|
| Method step 11: | The first configuration is incomplete. The effective range list is not checked as yet. |
| Method step 12: | The effective range list does not yet have a CRC signature. The F module and the HMI go into effective range check mode. |
| Method step 13 | The effective range module runs and supplies the received TAG IDs with the corresponding distances. |
| Method step 14 | The information from the TAGs is made available to the F module. |
| Method step 15 | The TAG ID and associated effective range are shown on the display. |
| Method step 16 | The user checks the effective range list on the display with the code on the machine. If both are identical, the user confirms this effective range. |
| Method step 17 | During the confirmation the HMI sends the F module the effective range and TAG identified in the HMI. |
| Method step 18 | The F module checks whether the effective range received from the HMI matches the effective range determined on the F module. If it does, this entry is marked as checked in the effective range list. |
| Method step 19 | The F module returns the result of the check to the HMI. |
| Method step 20 | If all entries in the effective range list have been checked and confirmed, the configurer requests the checksum for the effective range list. |
| Method step 21 | The HMI requests the checksum for the effective range list from the F module. |
| Method step 22 | The F module calculates the CRC sum only via the entries in the effective range list that the F module has characterized as checked. If not all entries were checked, the stored CRC does not match the configured CRC. |
| Method step 23 | The CRC signature determined is sent to the HMI in CRC-secured fashion and is stored on the flash of the control device. This CRC must always be sent to the F module during initialization of the F module. |
| Method step 24 | The CRC sum determined by the F module is shown on the display. |
| Method step 25 | The user must enter the CRC signature shown on the display into the ES. |
| Method step 26 | The configurer loads the "new configuration" onto the control device. |

In known fashion HMI is the human-machine user interface.

There follows a brief explanation of the terms used in the above method steps. ES designates an engineering system for configuring and administering projects. The main processor is a standard processor containing standard software and runtime HMI, which communicates with the safety module (F module) via a serial interface. The F module contains safety-related hardware and software. The WB module designates an effective range module that contains hardware and software for detecting the RFID transponders. Display designates the display on the control device 4 for displaying "unsafe" information.

The invention claimed is:

1. A method for using a mobile control device, with which at least one machine can be controlled in safety-related fashion in a system, comprising:

effecting the control within an effective range which is assigned to the machine and which is delimited by one or more RFID transponders;

configuring a effective range list, in which in each case the effective range associated with the RFID transponders installed in the system and the maximum distance between the control device and the relevant RFID transponders are stored; and checking the effective range list, for which purpose the relevant transponder identification number is received from the RFID transponders using the control device in test mode in the effective ranges of the RFID transponders and subsequently the relevant effective range identification number is displayed.

2. The method as claimed in claim 1, wherein when the displayed effective range identification number is identical to a coding on the relevant machine a corresponding confirmation check remark is made in the effective range list.

3. The method as claimed in claim 2, wherein after checking all entries in the effective range list containing the corresponding confirmation check remarks, a checksum is formed.

4. The method as claimed in claim 1, wherein names are assigned to the effective ranges and the relevant name is displayed to a user when logging on in an effective range, whereupon the user enters into the control device a coding which is relevant to the effective range and which is readable in the area of the relevant machine.

5. The method as claimed in claim 2, wherein names are assigned to the effective ranges and the relevant name is displayed to a user when logging on in an effective range, whereupon the user enters into the control device the coding which is relevant to the effective range and which is readable in the area of the relevant machine.

6. The method as claimed in claim 3, wherein names are assigned to the effective ranges and the relevant name is displayed to a user when logging on in an effective range, whereupon the user enters into the control device the coding which is relevant to the effective range and which is readable in the area of the relevant machine.

\* \* \* \* \*